(12) United States Patent
Fukuyo et al.

(10) Patent No.: US 12,405,515 B2
(45) Date of Patent: Sep. 2, 2025

(54) ELECTRONIC DEVICE

(71) Applicant: CANON KABUSHIKI KAISHA, Tokyo (JP)

(72) Inventors: Keisuke Fukuyo, Tokyo (JP); Junji Ito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 649 days.

(21) Appl. No.: 17/839,686

(22) Filed: Jun. 14, 2022

(65) Prior Publication Data

US 2022/0413363 A1    Dec. 29, 2022

(30) Foreign Application Priority Data

Jun. 29, 2021   (JP) .................................. 2021-107986

(51) Int. Cl.
*G03B 13/06*        (2021.01)
(52) U.S. Cl.
CPC .................................. *G03B 13/06* (2013.01)
(58) Field of Classification Search
CPC .... G02B 23/2476; G02B 23/16; G03B 11/04; G03B 13/06; G03B 11/046
See application file for complete search history.

(56) References Cited

U.S. PATENT DOCUMENTS

| | | | | |
|---|---|---|---|---|
| 2012/0050861 | A1* | 3/2012 | Ujiie | H04N 23/52 359/511 |
| 2020/0007747 | A1* | 1/2020 | Ueda | H04N 23/63 |
| 2020/0112660 | A1* | 4/2020 | Nitto | H04N 23/53 |
| 2021/0333687 | A1* | 10/2021 | Oki | G03B 11/046 |

FOREIGN PATENT DOCUMENTS

| | | | |
|---|---|---|---|
| JP | 2015075529 A | * | 4/2015 |
| JP | 2016-053658 A | | 4/2016 |
| WO | 2020100327 A | | 5/2020 |

OTHER PUBLICATIONS

Morita, English translation for JP-2015075529-A (Year: 2015).*
Feb. 25, 2025 Japanese Office Action, which is enclosed without an English Translation, that issued in Japanese Patent Application No. 2021-107986.

* cited by examiner

*Primary Examiner* — Jonathan Y Jung
(74) *Attorney, Agent, or Firm* — Cowan, Liebowitz & Latman, P.C.

(57) ABSTRACT

An imaging device is configured to include a finder and an eyecup unit. An eyecup is provided so as to surround an eyepiece window formed on a cover member. A base member holds the eyecup and the cover member. The eyecup is configured to include a curved and hollow eyepiece region, a first holding region comprising a first hole group, and a second holding region comprising a second hole group. The base member is configured to include a first protrusion group corresponding to the first hole group and a second protrusion group corresponding to the second hole group. The first hole group fits with the first projection group, and the second hole group fits with the second projection group.

19 Claims, 5 Drawing Sheets

ELECTRONIC DEVICE

BACKGROUND OF THE INVENTION

Field of the Invention

The present invention relates to an electronic device that includes an eyepiece member in a finder.

Description of the Related Art

A finder provided in an imaging device includes a configuration for a photographer to observe an image of a subject guided to an imaging sensor. A subject field angle, setting information, a photographed image and the like are displayed in the finder. The photographer is able to look into the finder in an eyepiece state and confirm the display content. An eyecup provided in an eyepiece unit of the finder is a member configured to block external light and make it easy for a photographer to look into the eyepiece unit. An eyecup is often formed of an elastic member, and is easily deformed when pulled. Therefore, it is necessary to take measures against the eyecup becoming detached from an exterior portion or, if the eyecup is used in a deformed state, its shape not fitting the shape of the eye periphery.

Japanese Patent Publication Laid-Open No. 2016-53658 discloses a viewfinder provided with a hollow cover attached to an imaging device body and an eyecup attached to the outside surface of the cover. The cover is divided in two, consisting of an upper cover and a lower cover. A screw is provided in a space for disposing a fixing screw for fixing the upper cover and the lower cover, and a hole through which the fixing screw is passed and a groove shape for passing a screwdriver are provided. A protruding shape (pulling prevention rib) formed on the inner surface of the eye cup is fitted with a groove shape for passing the screwdriver.

In the conventional technology disclosed in Japanese Patent Publication Laid-Open No. 2016-53658, because a groove shape for passing a fixing screw is provided in the optical axis direction of the eyecup, it is necessary to secure the size of the eyecup in the optical axis direction. Accordingly, this may be a cause of inhibiting space saving.

SUMMARY OF THE INVENTION

The present invention provides an electronic device capable of fixing a component of an eyepiece member without using an adhesive and the like, capable of saving space, and capable of suppressing detachment of a component that configures the eyepiece member.

An electronic device according to an embodiment of the present invention is an electronic device comprising an eyepiece member in a finder provided on a main body, the eyepiece member comprising a first member in which an eyepiece window of the finder is formed, a second member provided around the eyepiece window, and a third member configured to hold the first and second members, wherein, in the second member, an eyepiece region is hollow, and a first and a second hole group is included, wherein the third member includes a first protrusion group that protrudes towards a side of the main body and fits with the first hole group, and the first or the third member includes a second protrusion group that fits with the second hole group.

Further features of the present invention will become apparent from the following description of exemplary embodiments with reference to the attached drawings.

DESCRIPTION OF THE EMBODIMENTS

Hereinafter, preferred embodiments of the present invention will be explained in detail with reference to the accompanying drawings. The present invention can be applied to various electronic devices that includes an eyepiece member in a finder. In the embodiments, an example of an imaging device configured to include an eyecup in a finder eyepiece unit is shown as an electronic device.

First Embodiment

Figure 1A:
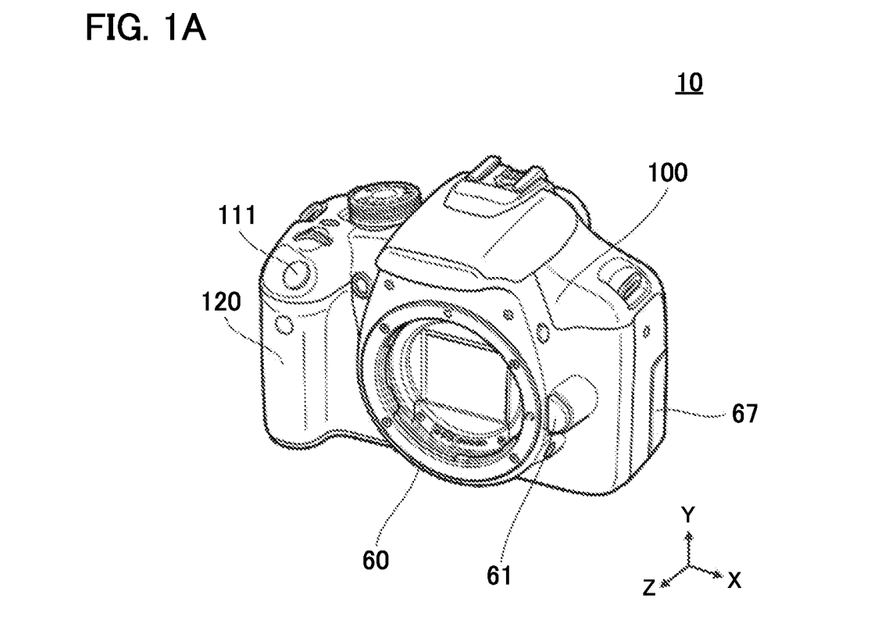
FIGS. 1A and 1B are external perspective views of an imaging device according to an embodiment of the present invention.
Figure 1B:
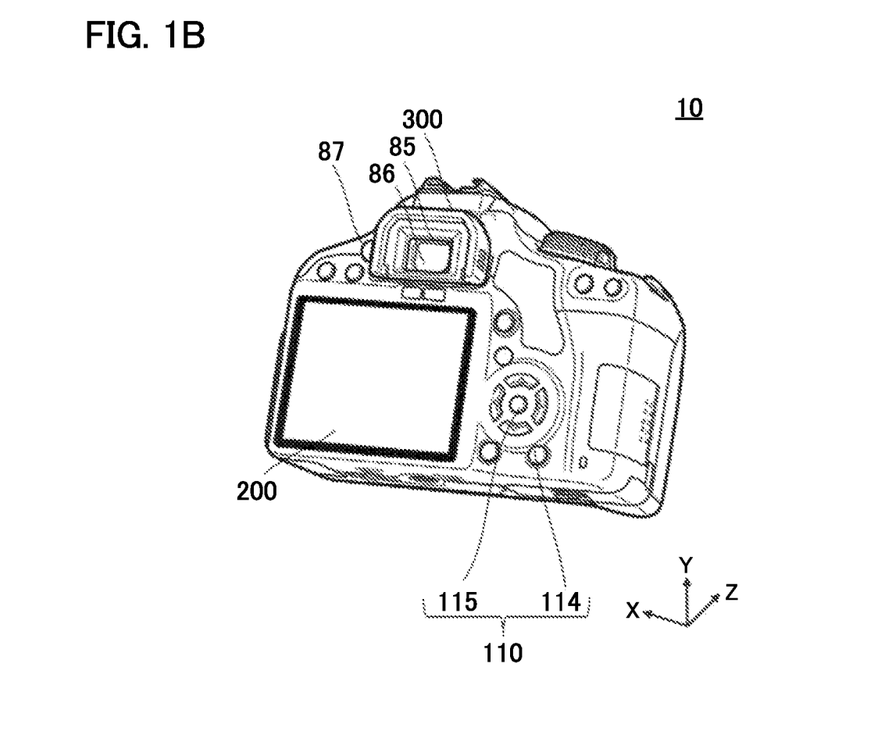
Figure 2:
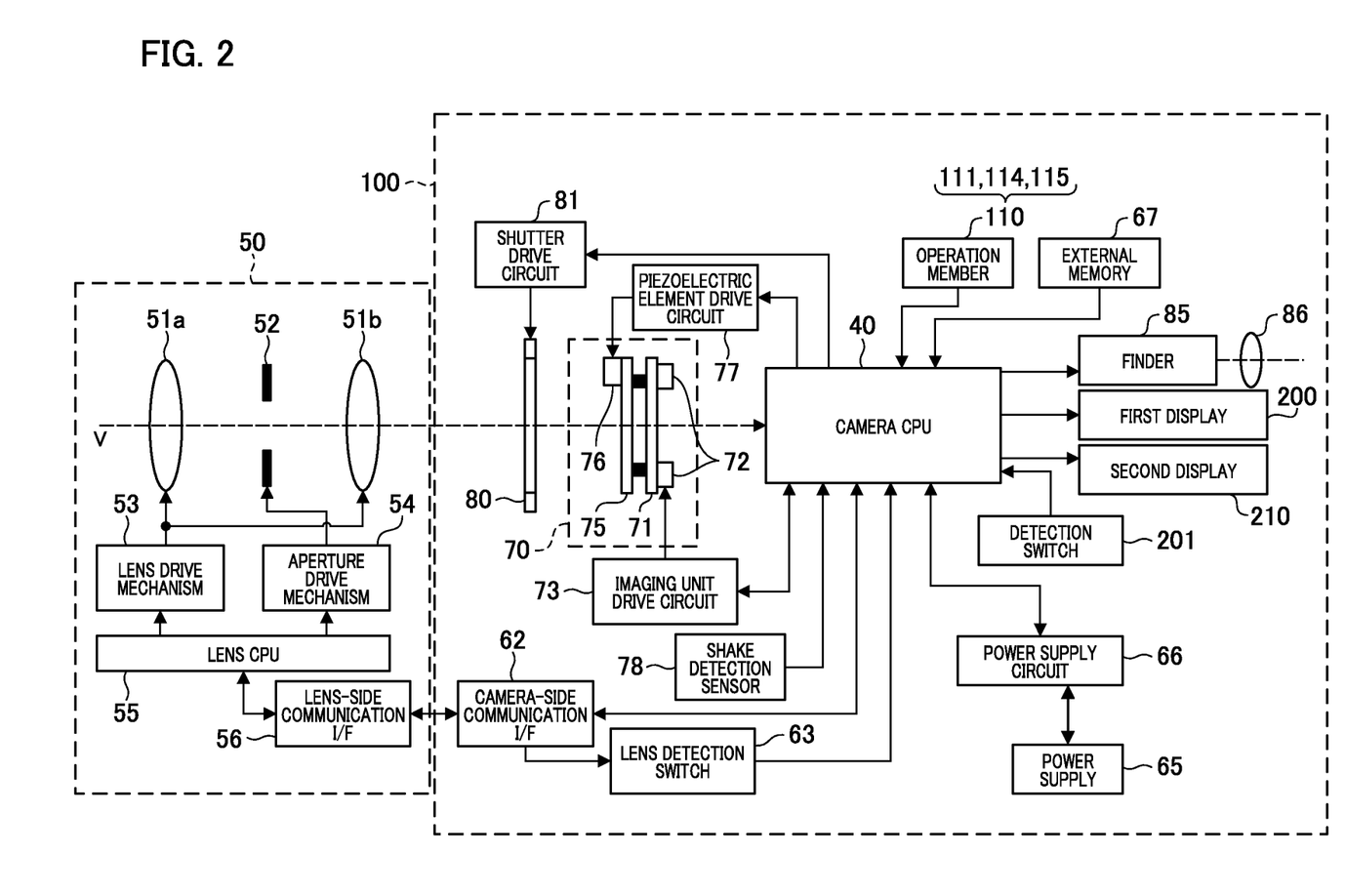
FIG. 2 is a block diagram showing a functional configuration of an imaging device according to an embodiment of the present invention.

Referring to FIG. 1A to FIG. 2, a digital camera configured to include an interchangeable lens (hereinafter, simply referred to as a "camera") 10 will be explained as an imaging device according to the present embodiment. FIGS. 1A and 1B show a main body unit 100 in a state in which an interchangeable lens unit is not attached. The positional relationship of each unit is explained by defining the subject side as the front surface side. FIG. 1A is a perspective view when a camera 10 is viewed from the front surface side, and FIG. 1B is a perspective view when the camera 10 is viewed from the back surface side. The optical axis direction of the camera 10 is defined as the Z direction, and the two directions orthogonal to the Z direction are defined as the X direction and the Y direction, respectively. The horizontal direction is defined as the X direction, and the vertical direction is defined as the Y direction. FIG. 2 is a block diagram showing the functional configuration of the camera 10.

A grip unit 120 is a holding unit for a user to hold the camera 10. The grip unit 120 is provided at one end of the main body unit 100, and is formed in a curved shape so as to be grasped by the user by covering with the palm and hooking the fingers. By forming the surface of the grip unit 120 with an elastic member such as synthetic rubber, it is possible to obtain good gripping performance.

The camera 10 is configured so that a lens unit 50 (refer to FIG. 2) can be attached and detached with respect to a mount opening unit 60 of the front surface by a pressing operation of a lens release button 61. The lens unit 50 configures an imaging optical system, and is configured to include a focus lens 51a and a zoom lens 51b consisting of a plurality of lens groups. The lens unit 50 is configured to include an aperture 52 that adjusts an opening amount. A lens drive mechanism 53 drives the focus lens Ma and the zoom lens 51b, and performs focusing and zoom driving. An aperture drive mechanism 54 drives the aperture 52, and controls an aperture value. A lens CPU (central processing unit) 55 performs various signal processing, and controls each unit in the lens unit 50.

The main body unit 100 and the lens unit 50 are electrically connected by a camera-side communication I/F (interface) unit 62 and a lens-side communication I/F unit 56, and can communicate with each other. In addition, power supply from the main body unit 100 to the lens unit 50 is performed.

A camera CPU 40 is a central unit that controls an imaging system, and performs operation control of each element of the camera 10. Hereinafter, the camera CPU 40 is simply referred to as "CPU 40". A lens detection switch 63 of the main body unit 100 outputs a detection signal, which determines whether the main body unit 100 and the lens unit 50 can communicate via the camera-side communication I/F unit 62 and the lens-side communication IF unit 56, to the CPU 40. In addition, the lens detection switch 63 outputs a signal for identifying the type of lens unit 50 mounted on the main body unit 100 to the CPU 40.

A power supply 65 provides power to each element of the camera 10. The power supply 65 is configured by a battery pack and the like attachable to and detachable from the main body unit 100. A power supply circuit 66 converts the voltage of the power supply 65 into a voltage required for the operation of each element of the camera 10, and supplies the voltage to a circuit unit.

A shutter 80 consists of a focal plane shutter and is driven by a shutter drive circuit 81, and performs control of the incidence of an imaging light flux by exposure and shielding of an imaging sensor 71. The shutter drive circuit 81 can move to and hold an exposed state (open state) or a shielded state (closed state) of the imaging sensor 71 by opening and closing a shutter curtain (not shown).

The imaging sensor 71 captures the imaging light flux from the lens unit 50 and performs photoelectric conversion. For example, a CMOS (complementary metal oxide semiconductor) imaging sensor or a CCD (charge-coupled device) imaging sensor is used as the imaging sensor 71, and includes an electronic shutter function.

An optical low-pass filter 75 disposed on the front surface side of the imaging sensor 71 is a rectangular optical element consisting of a material such as quartz crystal. A piezoelectric element 76 is adhesively attached to the surface of the optical low-pass filter 75, and a piezoelectric element drive circuit 77 performs energization of the piezoelectric element 76. The piezoelectric element drive circuit 77 is electrically connected to the piezoelectric element 76 via a piezoelectric element flexible substrate (not shown). By vibrating the optical low-pass filter 75 in the Z direction in a plurality of vibration modes of different orders through the energization control of the piezoelectric element 76, it is possible to remove dust particles adhering to the surface of the optical low-pass filter 75.

A shake detection sensor 78 is, for example, an angular velocity sensor, and periodically detects the angular velocity of the shake of the camera 10 and converts the angular velocity into an electrical signal. The output of the shake detection sensor 78 is acquired by the CPU 40 as a detection signal of the shake amount of the camera 10.

An imaging unit 70 includes an imaging sensor 71, an optical low-pass filter 75, a piezoelectric element 76, and imaging unit drive mechanism 72. An imaging unit drive mechanism 72 is a mechanism for driving the imaging unit 71 within a predetermined plane, for example, a drive coil, a permanent magnet, and a position detection sensor (all not shown) are provided to drive the imaging sensor 71 on a plane orthogonal to the optical axis of the camera 10.

An imaging unit drive circuit 73 is electrically connected to an imaging unit drive mechanism 72 via a flexible substrate for the imaging unit drive mechanism (not shown), and performs energization control of the imaging unit drive mechanism 72. The CPU 40 acquires a detection signal from the shake detection sensor 78, and performs drive control of the imaging unit 70 in a direction to cancel out the shake of the camera 10 according to the detection result. Thereby, an image blur caused by the shake of the camera 10 can be corrected.

An external memory 67 consists of, for example, a semiconductor memory card attachable to and detachable from the main body unit 100, and stores data such as a photographed image. An operation member 110 is a member for the user to perform an operation instruction to the camera 10. The CPU 40 receives an instruction signal from each type of the operation members 110 and performs each type of control. For example, FIG. 1A shows a shutter button 111 configured to perform an instruction of an imagine operation, and FIG. 1B shows a selection button 114 for selecting various settings, and a setting button 115 for determining various settings.

The camera 10 is configured to provide a first display 200 and a second display 210. As shown in FIG. 1B, the first display 200 is provided on the back surface of the camera 10. The first display 200 is configured by an LCD (liquid crystal display) or the like, and a finder 85 is provided on the upper side (+Y side) thereof so that the user can observe the subject.

The finder 85 is an electronic viewfinder that includes an eyepiece optical system 86 provided at the upper left portion of the back surface of the camera 10. The second display 210 configures a display unit of the electronic viewfinder. The finder 85 performs display of a through image by the imaging sensor 71 and a setting display of the camera 10.

A diopter adjustment dial 87 (refer to FIG. 1B) is a diopter adjustment member for a user to perform an operation, and is provided on an exterior portion of the main body unit 100. The diopter adjustment dial 87 is connected to an eyepiece optical system 86. The eyepiece optical system 86 is configured to advance and retract in the Z direction by the rotation operation of the diopter adjustment dial 87. The user can perform adjustment of the diopter to suit their own eyes.

An eyecup unit 300 is attached to the finder 85. There is an embodiment of a configuration in which the eyecup unit 300 is removable from the main body unit 100 of the camera 10, and a further embodiment of a configuration in which the eyecup unit 300 is fixed to the main body unit 100.

The finder 85 protrudes from the main body unit 100 toward the back surface side (−Z side). When the user views the main body unit 100 of the camera 10 from the back surface side, the finder 85 is positioned above the first display 200 when the user holds the camera 10 by gripping the grip unit 120 with the right hand.

Figure 3A:
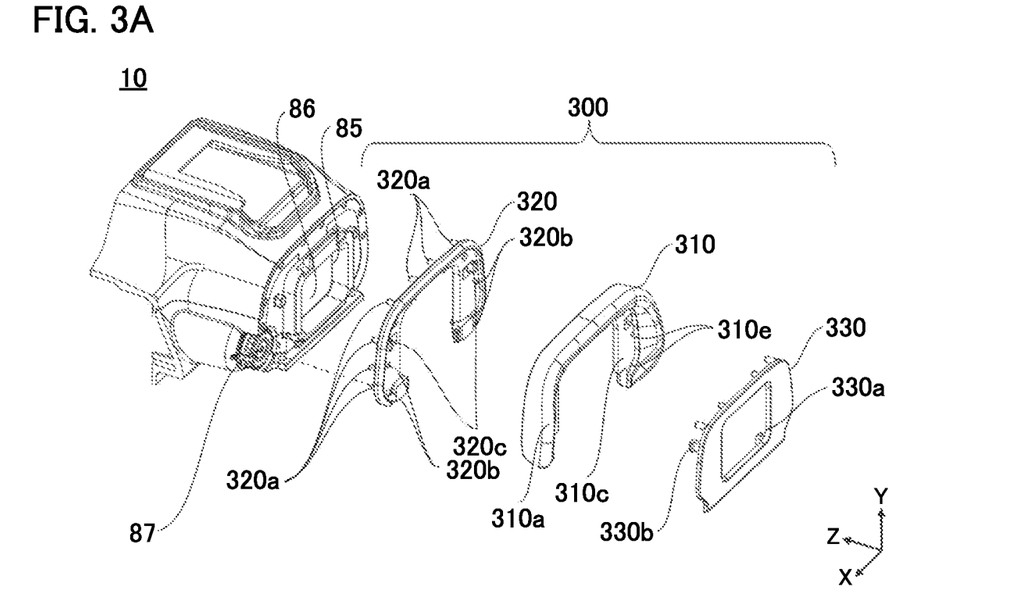
FIGS. 3A and 3B are exploded perspective views of an eyecup unit according to a first embodiment of the present invention.
Figure 3B:
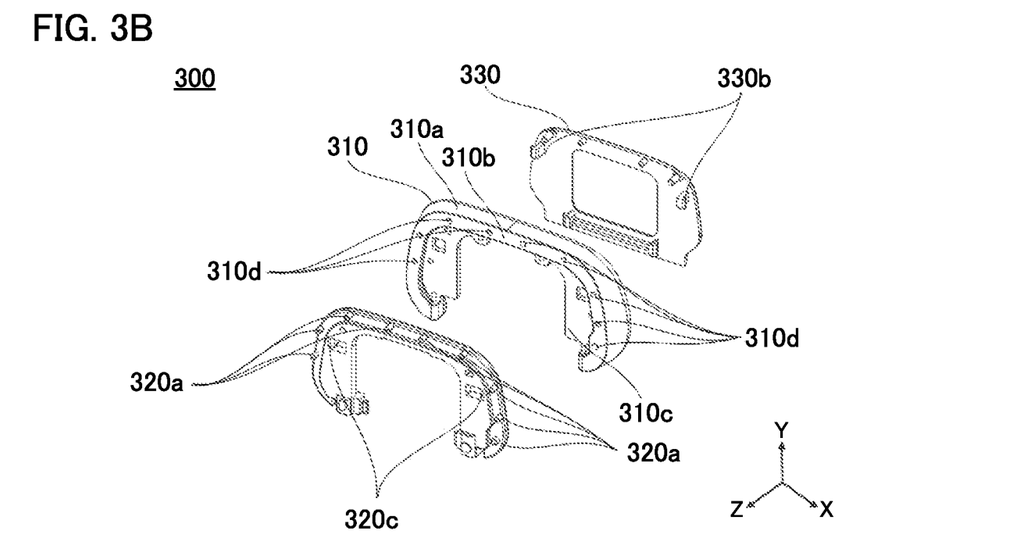

Next, with reference to FIG. 3A to FIG. 4E, the eyecup unit 300 according to the present embodiment will be described in detail. FIG. 3A is an exploded perspective view of the camera 10 and eyecup unit 300 when viewed from the back surface side. FIG. 3B is an exploded perspective view of the eyecup unit 300 when viewed from the front surface side.

The eyecup unit 300 is configured by an eyecup 310, a base member 320, and a cover member 330. The eyecup 310 is a member that comes in contact with the face (the periphery of the eye) when the user looks into the finder 85, and is formed of a soft material such as silicone or rubber. The base member 320 is a member that holds the eyecup 310, and is attached or fixed to the finder 85. The cover member 330 is a member that includes an eyepiece window. The base member 320 and the cover member 330 are formed of hard material such as PC (polycarbonate) resin or ABS (Acrylonitrile Butadiene Styrene) resin.

A hollow eyepiece region 310a in the eyecup 310 is a region that is in contact with the face of the photographer when the photographer looks into the finder 85. The eyecup 310 includes a first holding region 310b and a second holding region 310c. The first holding region 310b is a region that extends towards the outer peripheral side of the eyepiece region 310a with respect to the finder 85, and includes a plurality of hole portions formed therein. Hereinafter, these hole portions are referred to as a "first hole group 310d". The second holding region 310c is a region that extends towards the inner peripheral side of the eyepiece region 310a with respect to the finder 85, and includes a plurality of hole portions formed therein. Hereinafter, these hole portions are referred to as a "second hole group 310e".

The base member 320 is formed by a first protrusion group 320a and a second protrusion group 320b, and an engaged portion 320c. The first protrusion group 320a is configured by a plurality of protrusions that protrude toward the front surface side (+Z side) and fit into the first hole group 310d. The second protrusion group 320b is configured by a plurality of protrusions that protrude toward the back surface side (−Z side) and fit into the second hole group 310e. The engaging portion 330b of the cover member 330, which will be described hereinafter, is engaged with the engaged portion 320c.

An eyepiece window 330a configured to allow a photographer to look into the finder 85 is formed in a portion exposed to the exterior by the cover member 330. The cover member 330 includes an engaging portion 330b formed in a position corresponding to the engaged portion 320c of the base member 320. By engaging the engaging portion 330b of the cover member 330 and the engaged portion 320c of the base member 320, the eyecup 310 is supported in a state where it is held between the cover member 330 and the base member 320.

Figure 4A:
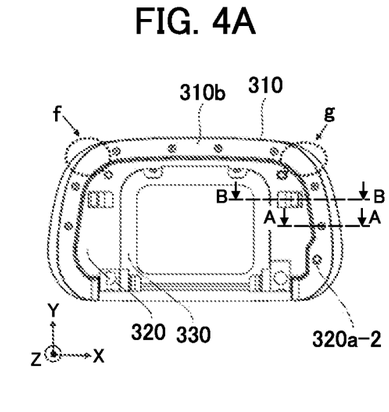
FIGS. 4A to 4E are diagrams showing an eyecup unit according to a first embodiment of the present invention.
Figure 4B:
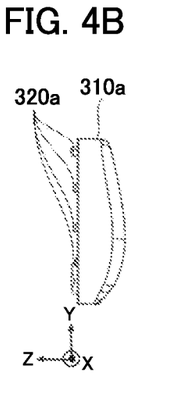
Figure 4C:
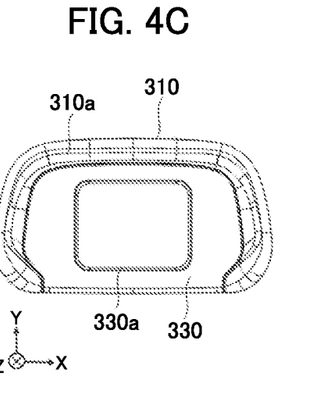
Figure 4D:
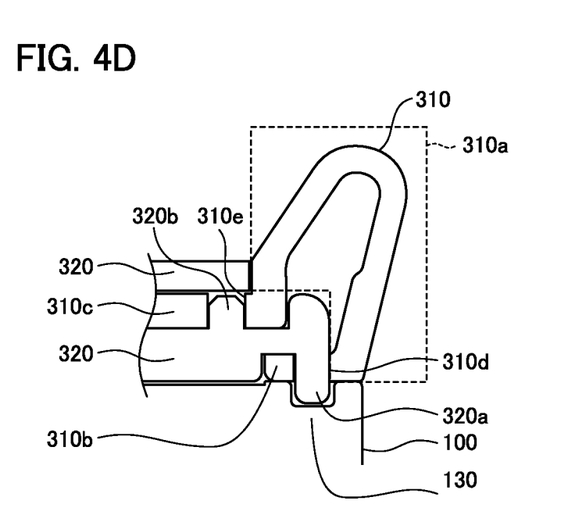
Figure 4E:
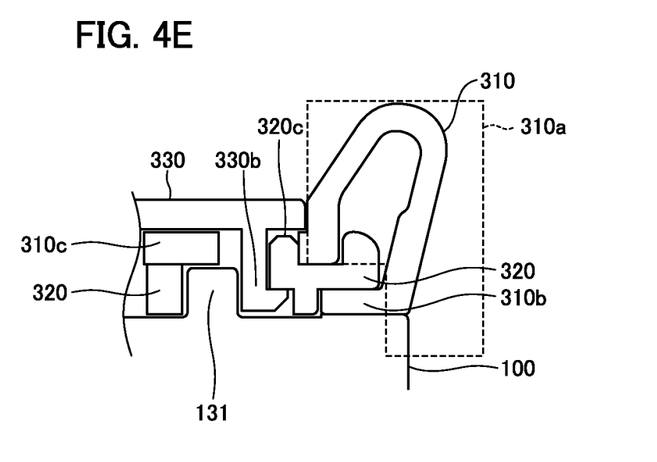

FIGS. 4A to 4C are diagrams of the eyecup unit 300 when viewed from different directions. FIG. 4A is a diagram of the eyecup unit 300 when viewed from the front surface side, FIG. 4B is a side surface view, and FIG. 4C is a diagram of the eyecup unit 300 when viewed from the back surface side. FIG. 4D and FIG. 4E show a state in which the eyecup unit 300 of FIG. 4A is attached to the camera 10. FIG. 4D is a cross-sectional view taken along the line A-A shown in FIG. 4A, and FIG. 4E is a cross-sectional view taken along the line B-B shown in FIG. 4A.

As shown in FIG. 4D, the protrusions that configure the first protrusion group 320a of the base member 320 are respectively fitted with the holes that configure the first hole group 310d of the eyecup 310. Note that the first protrusion group 320a further enters into a groove unit 130 provided in the camera 10. The first hole group 310d (and the first protrusion group 320a) is positioned in a location proximate to the eyepiece region 310A, indicated by a dotted line in the X-Z plane. That is, the first hole group 310d of the eyecup 310 is provided at a position included in a range that includes a portion of the eyepiece region 310a on a projection plane perpendicular to the optical axis of the finder 85. In addition, the second protrusion group 320b provided on the base member 320 is loosely fitted into the second hole group 310e of the eyecup 310.

As shown in FIG. 4E, by engaging the engaging portion 330b of the cover member 330 with the engaged portion 320c of the base member 320, the cover member 330 is supported by the base member 320. In a state where the eyecup unit 300 is attached to the main body unit 100, the engaging portion 330b is in a state of being opposed to the side surface of a regulating portion 131 of the main body unit 100.

In a state in which the engaged portion 320c of the base member 320 and the engaged portion 330b of the cover member 330 are engaged with each other, the eyecup 310 is held between the first holding region 310b and the second holding region 310c, respectively, and the movement thereof is regulated.

As shown in FIG. 4A, the first hole group 310d and the first protrusion group 320a are not provided at the upper (+Y side) corners of the eyecup unit 300 (portion "f" and portion "g" as shown by the dotted lines). In addition, at least one protrusion (FIG. 4A: 320a-2) of the first protrusion group 320a is disposed substantially coaxially with the diopter adjustment dial 87. Thereby, with respect to an external impact on the eyecup 310, the concentration of stress to one hole portion of the first hole group 310d can be mitigated, and the effect of preventing or suppressing the detachment of the eyecup 310 can be obtained.

In the present embodiment, the first protrusion group 320a of the base member 320 protruding towards the side of the finder 85 (main body unit side) has the function of an anchor for preventing or suppressing the deformation of the hollow eyepiece region portion in the eyecup 310 towards the outer peripheral side. In addition, the second protrusion group 320b of the base member 320 protruding towards the side of the cover member 330 has the function of an anchor for preventing or suppressing the deformation of the hollow eyepiece region portion in the eyecup 310 towards the inner peripheral side.

According to the present embodiment, while enabling space saving, it is possible to realize a configuration in which the eyecup 310, which is a component that configures the eyepiece member, is not easily detached. In addition, because the first holding region 310b and the second holding region 310c of the eyecup 310 do not appear on the exterior of the camera 10, this contributes to improvement of the appearance thereof.

Modifications of the First Embodiment

In the first embodiment, the second protrusion group 320b is formed on the base member 320. However, in a first modification, a group of protrusions corresponding to the second protrusion group 320b is formed on the cover member 330. That is, the protrusion group included in the cover member 330 and the second hole group 310e included in the eyecup 310 are fitted with each other.

In addition, in the first embodiment, the second hole group 310e is formed in the eyecup 310. However, in a second modification, the second hole group is formed in the cover member 330. In this case, a protrusion group to be fitted with the second hole group is formed in the base member 320 or in the eyecup 310.

In a third modification, a plurality of projection groups corresponding to the first protrusion group 320a and the second protrusion group 320b, respectively, are formed in the eyecup 310. A plurality of hole groups corresponding to the first hole group 310d and the second hole group 310e, respectively, are formed in the base member 320.

Second Embodiment

Figure 5A:
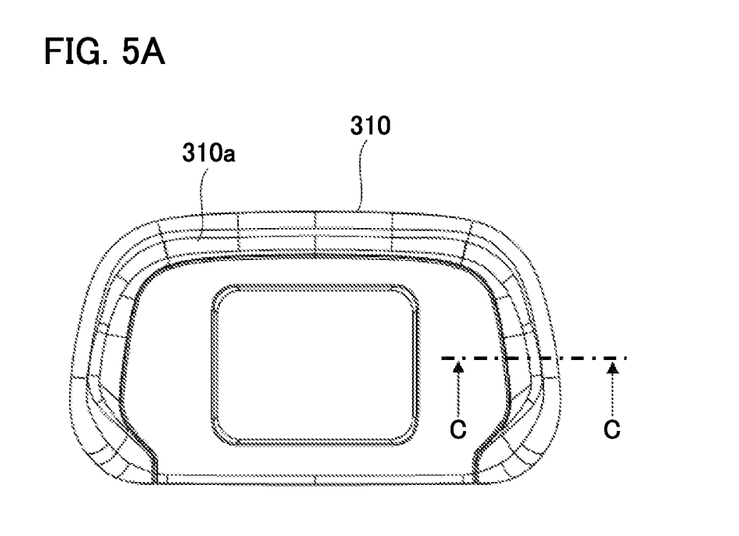
FIGS. 5A and 5B are diagrams showing an eyecup unit according to a second embodiment of the present invention.
Figure 5B:
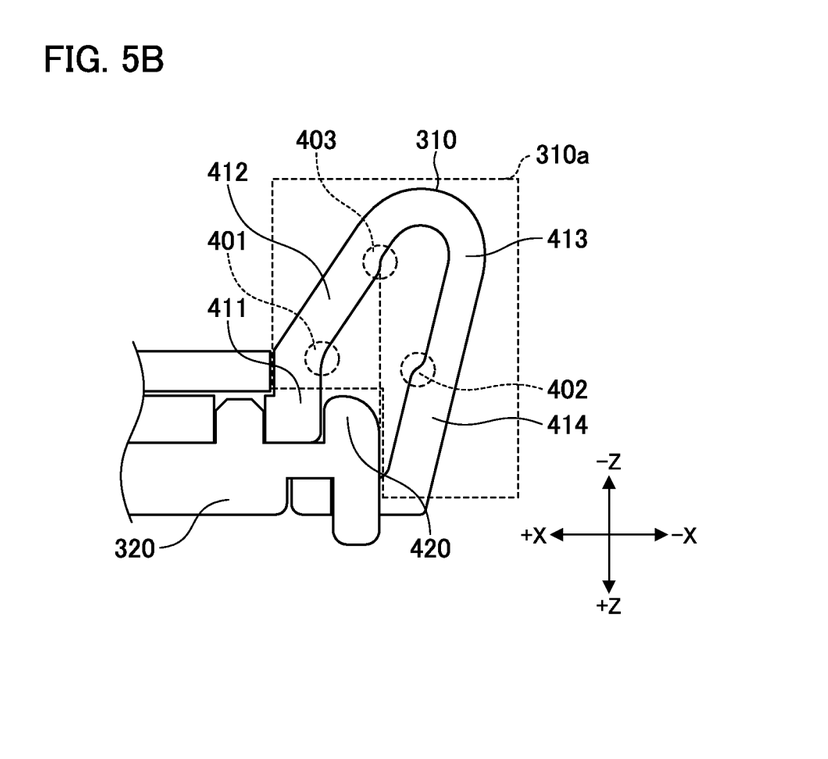

With reference to FIGS. 5A and 5B, a second embodiment of the present invention will be explained. In the present embodiment, a configuration that enables both good tactile feel and improved reliability is shown with respect to the eyecup unit 300. Note that the explanations of matters that are similar to those of the first embodiment are omitted, and the shape of the hollow eyepiece region 310a in the eyecup unit 300, which is a point of difference, will be explained in detail.

FIG. 5A is a diagram of the eyecup unit 300 when viewed from the back surface side. FIG. 5B is a cross-sectional view taken along the C-C line in FIG. 5A. In FIG. 5B, only the shape on one side of the eyecup unit 360 is shown. In the illustrated X direction, the +X side is the side approaching the optical axis of the finder 85, and the −X side is the side separated from the optical axis of the finder 85. In addition, in the Z direction, the +Z side is the subject side, and the −Z side is the photographer's side or the back side.

The eyepiece region 310a is a region that includes a portion that the photographer comes in contact with when looking into the finder 85, and has a shape that is curved toward the −Z side along the way from the +X side towards the −X side. Due to this shape, light shielding properties can be ensured, and by adopting a hollow structure, a good tactile feel can be ensured.

On the inner surface side of the eyepiece region 310a (the side that does not appear on the exterior), a plurality of wall thickness change points are provided. The wall thickness change point is a point where the thickness (wall thickness) of a portion that extends from the +X side towards the −X side in the eyecup 310 changes. When viewed from the Y direction, as shown by the circular frame of the dotted line in FIG. 5B, the first wall thickness change point 401 is provided from the +X side towards the −Z side, and the second wall thickness change point 402 is provided from the −Z side towards the −X side. Further, a third wall thickness change point 403 is provided between the first wall thickness change point 401 and the second wall thickness change point 402.

The eyecup 310 includes, in order from the +X side, a first wall thickness portion 411, a second wall thickness portion 412, a third wall thickness portion 413, and a fourth wall thickness portion 414. From the first wall thickness portion 411 on the +X side, the wall thickness portion changed at the first wall thickness change point 401 is the second wall thickness portion 412. The wall thickness portion changed at the third wall thickness change point 403 with respect to the second wall thickness portion 412 is the third wall thickness portion 413. The wall thickness portion changed at the second wall thickness change point 402 with respect to the third wall thickness portion 413 is the fourth wall thickness portion 414. That is, in the present embodiment, three wall thickness change points 401, 402, and 403 are provided when viewed from the Y direction, so that the wall thickness can be divided into four different types of wall thickness portions.

These four different types of wall thickness portions will be explained in detail. The thickness of the second wall thickness portion 412 (denoted by "d2") is set to be equal to or smaller than the thickness of the first wall thickness portion 411 (denoted by "d1"). The thickness of the third wall thickness portion 413 (denoted by "d3") is set to be smaller than the thickness of the fourth wall thickness portion 414 (denoted by "d4"). That is, in the present embodiment, the following conditions of an inequality are satisfied:

$$d1 \geq d2 \qquad \text{Condition 1:}$$

$$d3 < d4 \qquad \text{Condition 2:}$$

Thus, a bent portion is formed based on the first wall thickness change point 401 and the second wall thickness change point 402.

In the present embodiment, the first wall thickness change point 401 and the second wall thickness change point 402 are set so as to be substantially the same height (distance in the Z direction) from the base member 320, so that the photographing posture is parallel with respect to a subject. Thereby, even in a case in which the user looks into the finder 85 in a state where a predetermined force or greater is applied to the finder 85 at the time the user's eye is in contact with the finder, the hollow eyepiece region 310a is deformed so as to be bent with the first wall thickness change point 401 and the second wall thickness change point 402 as fulcrum points.

Further, the base member 320 is configured to include a protruding portion 420 so as to be surrounded in proximity to the hollow eyepiece region 310a. The protruding portion 420 is a portion protruding from the base member 320 towards the −Z side. Each of the first wall thickness change point 401 and the second wall thickness change point 402 is provided at a position further toward the back surface side (−Z side) than the back end portion of the protruding portion 420 (the convex portion that protrudes the most towards the back surface side).

With the above configuration, it is possible for a user to maintain a comfortable photographing state without having a sense of incongruity due to contact with the protruding portion 420 at the time of eye contact. The protruding portion 420 plays a role of preventing lateral displacement from occurring when a force is applied from the +X side towards the −X side with respect to the eyepiece region 310a. In a case where there is no possibility of the occurrence of lateral displacement, it is not necessary to provide a protruding portion 420.

Next, the third wall thickness change point 403 will be explained. The second wall thickness portion 412 and the third wall thickness portion 413 are divided by the third wall thickness change point 403. In the present embodiment, the following condition of an inequality is satisfied:

$$d2 > d3 \qquad \text{Condition 3:}$$

In addition, the second wall thickness portion 412 is extended more towards the −X side than the protruding portion in the Z direction with respect to the rear end portion (the convex portion that protrudes the most towards the back surface side) of the protruding portion 420 provided in the base member 320. Further, there is no corner at the −X-side tip of the protruding portion 420, and a rounded shape is formed. For example, it is assumed that the user has dropped the camera 10 from the back side. Even in a case in which the second wall thickness portion 412 is crushed by being in contact with the protruding portion 420, damage to the eyecup 310 can be prevented or suppressed, and thereby, an eyecup 310 having higher reliability can be realized.

The hollow eyepiece region 310a includes a configuration having a shape that is inclined from the +X side towards the −X side, that is, from the inner side towards the outer side. Even when the first wall thickness change point 401 and the second wall thickness change point 402 are provided, the hollow eyepiece region 310a is inclined toward the −X side (outer side) at the time of eye contact. The user can comfortably perform photography without having the field of view obstructed.

Above, while the present invention has been described in detail based on the preferred embodiments, these particular embodiments are not intended to limit the present invention, and various modifications in a range that does not depart from the gist of the present invention are included in the scope of the present invention. The embodiments may also be combined as appropriate.

For example, in the embodiments, an example is shown in which the first wall thickness change point 401, the second wall thickness change point 402, and the third wall thickness change point 403 are provided on the inner side of the eyepiece region 310a, that is, on the side that is not exposed to the exterior. The embodiments are not limited thereby, and even in an embodiment in which the wall thickness change point is provided on the external appearance side of the eyepiece region 310a, the effect thereof is similar to that in the present embodiments. The present invention can also be applied to an optical finder.

According to the embodiment described above, it is possible to provide an imaging device mounted with a finder on which an eyecup can be fixed without using adhesives and the like, is effective in saving space, and is more reliable in preventing the eyecup from detaching.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-107986, filed Jun. 29, 2021, which is hereby incorporated by reference wherein in its entirety.

What is claimed is:

1. An electronic device comprising an eyepiece member in a finder provided on a main body, the eyepiece member comprising:
    a first member in which an eyepiece window of the finder is formed,
    a second member provided around the eyepiece window, and
    a third member configured to hold the first and second members,
    wherein, in the second member, a portion of an eyepiece region is hollow, and a first and a second hole group is included,
    wherein the third member includes a first protrusion group that protrudes towards a side of the main body and fits with the first hole group,
    wherein the first or the third member includes a second protrusion group that fits with the second hole group,
    wherein the main body includes a groove, and
    wherein in a state in which the eyepiece member is attached to the main body, protrusions that configure the first protrusion group and the groove are opposed to each other.

2. The electronic device according to claim 1,
    wherein the second member includes a first and a second holding region that extends from a portion of the eyepiece region, and
    wherein a first hole group is formed in the first holding region, and a second hole group is formed in the second holding region.

3. The electronic device according to claim 2,
    wherein a hole portion that configures the first hole group is not formed at a corner of the first holding region.

4. The electronic device according to claim 1,
    wherein the first hole group is provided at a position included in a range that includes a portion of the eyepiece region on a projection plane perpendicular to the optical axis of the finder.

5. The electronic device according to claim 1,
    wherein the finder includes an adjustment member configured to adjust a diopter, and
    wherein any protrusion in the first protrusion group is disposed substantially coaxially with the adjustment member.

6. The electronic device according to claim 1,
    wherein in a state in which the eyepiece member is attached to the main body, the first member is located at a position that is separated more from the main body than the third member, and the third member is not exposed to an exterior.

7. The electronic device according to claim 1,
    wherein the first member includes an engaging portion,
    wherein the third member includes an engaged portion that corresponds to the engaging portion, and
    wherein the movement of the second member is regulated by the engagement between the engaging portion and the engaged portion.

8. The electronic device according to claim 7,
    wherein the main body includes a regulating portion that opposes the engaging portion at a position proximate to the engaging portion.

9. The electronic device according to claim 1,
    wherein a portion of the eyepiece region has a curved shape, and is configured by a plurality of wall thickness portions having different thicknesses.

10. The electronic device according to claim 9,
    wherein among a first direction and a second direction orthogonal to an optical axis of the finder, when viewed from the first direction, the plurality of wall thickness portions are divided by a plurality of wall thickness change points, and
    wherein in a state in which the eyepiece member is attached to the main body, the plurality of wall thickness change points are located at a position that is separated more from the main body than the third member.

11. The electronic device according to claim 10,
    wherein among the plurality of wall thickness change points, a first wall thickness portion and a second wall thickness portion are divided by a first wall thickness change point, and a third wall thickness portion and fourth wall thickness portion are divided by a second wall thickness change point, and
    wherein the relationships,
    the thickness of the first wall thickness portion≥the thickness of the second wall thickness portion, and
    the thickness of the third wall thickness portion<the thickness of the fourth wall thickness portion,
    are satisfied.

12. The electronic device according to claim 11,
    wherein the second first wall thickness portion and the third first wall thickness portion are divided by a third wall thickness change point between the first wall thickness change point and the second wall thickness change point, and
    wherein the relationship,
    the thickness of the second wall thickness portion>the thickness of the third wall thickness portion is satisfied.

13. The electronic device according to claim 11,
wherein the first wall thickness change point and the second wall thickness change point are set to substantially the same distance with respect to the third member.

14. The electronic device according to claim 10,
wherein the third member is configured to include a protruding portion that protrudes in a third direction away from the main body at a position proximate to a portion of the eyepiece region, and
wherein each of the plurality of a wall thickness change points is located at a position that is separated more from the main body than the end portion of the protruding portion.

15. The electronic device according to claim 14,
wherein among the first and second wall thickness portions divided by a first wall thickness change point, the second wall thickness portion is extended to a side that is separated more from the first wall thickness portion in a second direction than the end portion of the protruding portion when viewed from the third direction.

16. The electronic device according to claim 10,
wherein, when viewed from the first direction, a portion of the eyepiece region is a shape that is inclined with respect to the second direction.

17. The electronic device according to claim 1, further comprising an imaging sensor.

18. An electronic device comprising an eyepiece member in a finder provided on a main body, the eyepiece member comprising:
a first member in which an eyepiece window of the finder is formed,
a second member provided around the eyepiece window, and
a third member configured to hold the first and second members,
wherein, in the second member, a portion of an eyepiece region is hollow, and a first hole group is included,
wherein the first member includes a second hole group,
wherein the third member includes a first protrusion group that protrudes towards a side of the main body and fits with the first hole group,
wherein the second or the third member includes a second protrusion group that fits with the second hole group,
wherein the main body includes a groove, and
wherein in a state in which the eyepiece member is attached to the main body, protrusions that configure the first protrusion group and the groove are opposed to each other.

19. An electronic device comprising an eyepiece member in a finder provided on a main body, the eyepiece member comprising:
a first member in which an eyepiece window of the finder is formed,
a second member provided around the eyepiece window, and
a third member configured to hold the first and second members,
wherein, in the second member, a portion of an eyepiece region is hollow, and a first and a second hole group is included,
wherein the third member includes a first and a second protrusion group that is fitted with the first and second hole group, respectively,
wherein the main body includes a groove, and
wherein in a state in which the eyepiece member is attached to the main body, protrusions that configure the first protrusion group and the groove are opposed to each other.

* * * * *